United States Patent [19]

Steel

[11] 4,328,935

[45] May 11, 1982

[54] FLEXIBLE MAGNETIC RECORDING TAPE HAVING LOW-FRICTION BACKSIDE COATING

[75] Inventor: Frank B. Steel, Maplewood, Minn.

[73] Assignee: Minnesota Mining and Manufacturing Company, St. Paul, Minn.

[21] Appl. No.: 158,694

[22] Filed: Jun. 12, 1980

[51] Int. Cl.³ ............................................. G11B 5/70
[52] U.S. Cl. .................................. 242/192; 360/134; 427/131; 428/329; 428/694; 428/900
[58] Field of Search ............... 428/900, 329, 409, 910, 428/692, 694, 695, 220; 427/131; 360/134; 242/192

[56] References Cited

U.S. PATENT DOCUMENTS

| | | | |
|---|---|---|---|
| 3,975,568 | 8/1976 | Rudness | 428/329 |
| 4,015,042 | 3/1977 | Chassaigne | 428/900 |
| 4,117,190 | 9/1978 | Akashi et al. | 428/329 |
| 4,135,031 | 1/1979 | Akashi et al. | 428/900 |
| 4,189,514 | 2/1980 | Johnson | 427/131 |

FOREIGN PATENT DOCUMENTS

| | | | |
|---|---|---|---|
| 2364878 | of 1975 | Fed. Rep. of Germany | |
| 2500546 | of 1976 | Fed. Rep. of Germany | 427/131 |
| 2512450 | of 1976 | Fed. Rep. of Germany | 428/900 |
| 2917565 | of 1979 | Fed. Rep. of Germany | 428/900 |
| 50-6765 | of 1975 | Japan | 428/900 |
| 51-14007 | of 1976 | Japan | 427/131 |

*Primary Examiner*—Stanley S. Silverman

[57] ABSTRACT

Magnetic recording tape having a nonmagnetizable backside coating including smooth equant particles having a Mohs hardness of at least 7. When the tape is used in a belt-driven cartridge, the presence of the equant particles in the backside coating provides improved uniformity of tape speed.

13 Claims, No Drawings

FLEXIBLE MAGNETIC RECORDING TAPE HAVING LOW-FRICTION BACKSIDE COATING

BACKGROUND OF THE INVENTION

U.S. Pat. No. 3,692,255 (Von Behren) discloses a magnetic recording tape cartridge for storing data wherein the tape is driven by a pretensioned belt. The specific embodiment of the patent employs magnetic recording tape which is 25 micrometers in thickness. The use of thinner tape has sometimes resulted in excessive variations in tape speed.

It was discovered that the excessive variations in tape speed resulted whenever the following two conditions occurred simultaneously: (1) the tension on the wound tape substantially exceeded the unwinding tension and (2) the tape tended to stick to the underlying convolution so that the windup tension was being released spasmodically. Under the worst conditions, there would be an audible "popping" noise as the tape was unwound.

It is not known whether tape drives other than belt-driven tapes involve this problem. While the belt of the Von Behren patent holds each convolution of recording tape tightly against the underlying convolution, the outer convolutions on an unbelted spool have more freedom to move circumferentially and thus to release windup tensions gradually before being unwound from the spool. Nevertheless, the continuing trend to thinner magnetic recording tapes increases the likelihood that the problem may also occur in other types of drives without anyone being aware of it.

OTHER PRIOR ART

The magnetic recording tape of German Offenlegungsschrift No. 2,364,878 (filed Dec. 28, 1973 and laid open for inspection on July 3, 1975) has a backside coating which is said to provide improved friction characteristics during rapid starting and stopping and also to provide improved scratch resistance. The backside coating consists of 30 to 60 weight-percent of a polymeric binder and correspondingly 70 to 40 weight-percent of a powder mixture which may consist of by weight (a) 15–60 parts of conductive carbon black, (b) 15–85 parts of a mixture comprising (1) 15–90 percent of flat silicate particles having a Mohs hardness of less than 6 (preferably 1–4 micrometers in diameter and 0.02 to 0.5 micrometer in thickness) and (2) correspondingly 85–10 percent of cube-to-sphere-shaped particles of an oxide having a Mohs hardness of more than 7 such as aluminum oxide (preferably 0.5–2 micrometers in diameter) and (c) 20–55 parts of an inorganic filler such as talc or aluminum oxide of a size selected to provide a preferred surface roughness of 0.8 to 1.2 micrometers (its particle size being said to be more important than its chemical composition).

U.S. Pat. No. 3,617,378 (Beck) concerns magnetic recording cards and shows apparatus for dispensing the cards from a stack into a reading device. A rubber picker roll contacts the backside of the lowermost card and frictionally drives it into the reading device. This requires a durable backside coating having a high coefficient of friction with the picker roll and a low coefficient of friction with each of the magnetic recording surface of the adjacent card and the aluminum deck of the reading device. The backside coating said to be most suitable comprises 8–40% by weight of nonmagnetic alpha-$Fe_2O_3$ particles. Although the patent does not mention the shape of those particles, the commercial product identified at column 5, line 19 is said to be acicular.

U.S. Pat. No. 4,135,031 (Akashi et al.) is directed to the problem of obtaining better winding characteristics in video tape by reducing the coefficient of friction between the magnetizable coating and the backside of the tape. This is achieved by a backside coating comprising a mixture of a major proportion of small inorganic particles and a minor proportion of larger inorganic particles which are called "spike grains". Preferred inorganic particles are "talc, lithopone and complex of zinc sulfide and zinc sulfate" (column 2, lines 61–62). Less preferred is aluminum oxide.

THE PRESENT INVENTION

The flexible magnetic recording tape of the present invention, like the tapes of the aforementioned Offenlegungsschrift, has a magnetizable frontside coating and a nonmagnetizable backside coating, each coating comprising a nonmagnetizable polymeric binder containing inorganic particles. As in the Offenlegungsschrift, some of the inorganic particles of the backside coating which have an average diameter of at least 0.1 micrometer may be of equant shape and have a Mohs hardness of at least 7. By "equant shape" is meant particles having a ratio of maximum diameter to minimum diameter of less than 2. As in the Offenlegungsschrift, the backside coating preferably also contains conductive carbon black particles of less than 0.1 micrometer in size and in sufficient quantity to bleed off static charges, an especially effective amount being 20–25 percent by volume of the backside coating. Such quantity of carbon black by itself provides a surface roughness of at least 0.2 micrometer. Carbon black particles may additionally provide a desirable reinforcing of the polymeric binder.

The novel tape differs from that of the Offenlegungsschrift in that said equant particles of its backside coating comprise substantially all of the particles in the backside coating which have an average diameter greater than 0.1 micrometer. Said equant particles are about 0.1 to 0.5 micrometer in average diameter, not more than about 10% of said equant particles have an average diameter exceeding about 0.8 micrometer, and substantially all of said equant particles are essentially free from sharp edges. Furthermore, the backside coating of the novel tape should have a surface roughness of 0.2–0.8 micrometer (as measured peak-to-peak with a 0.1-mil stylus), preferably 0.3–0.6 micrometer. The Offenlegungsschrift indicates a preferred surface roughness of 0.8–1.2 micrometers without indicating how this was measured. A surface indicating a given roughness value when measured peak-to-valley or with a stylus larger than 0.1 mil would indicate a higher roughness value when measured peak-to-peak with a 0.1-mil stylus.

If the backside coating of the novel tape had a surface roughness above 0.8 micrometer (peak-to-peak, 0.1-mil stylus), it would not be suitable for the tape cartridge of the aforementioned Von Behren U.S. Pat. No. 3,692,255 or other data tapes. Its equant particles of high Mohs hardness would emboss the facing magnetizable layer during storage in roll form, thus debasing its original smoothness, a surface roughness of not exceeding about 0.1 micrometer often being required for the magnetizable surface of a data tape.

The smooth equant particles should comprise about 0.5–10% by volume of the backside coating, which range is within the useful range of the cube-to-sphere-shaped particles of high Mohs hardness in the aforementioned Offenlegungsschrift. Preferably the smooth equant particles comprise 1–3% by volume of the backside coating, because a larger proportion might have an undesirable degree of abrasiveness, in spite of the fact that they are essentially free from sharp edges. At only 1–3% by volume, the smooth equant particles do not significantly change the degree of surface roughness provided by the conductive carbon black as mentioned above. At much more than 3% by volume, it is preferred that the average diameter of the smooth equant particles be toward the lower end of the useful 0.1–0.5 micrometer range in order to keep the surface roughness of the backside coating within the range of 0.2–0.8 micrometer.

Because of their high Mohs hardness, the smooth equant particles would be abrasive if they had sharp edges. Sharp particles would not only tend to damage the tape guides but would tend to pick magnetizable material out of the facing magnetizable coating, and eventually some of that magnetizable material would transfer back to the faceside of the tape. The smooth equant particles preferably are of uniform size and very few exceed twice the average diameter. If the average particle size were much larger than 0.5 micrometer of if a number of particles were significantly larger than the average, the backside coating might tend to abrade the tape guides.

The presence of the smooth equant particles in the backside coating has provided surprisingly improved uniformity of tape speed in magnetic recording tape systems in which the tape is driven by a pretensioned belt. The improvement in uniformity of tape speed has been observed only when the overall thickness of the tape has been 20 micrometers or less.

An especially useful material for the smooth equant particles is aluminum oxide which has a Mohs hardness of 9. It is readily available at reasonable cost while possessing each of the properties mentioned above. Suitable aluminum oxide particles can be obtained from Products Chimiques Ugine Kuhlmann, France, under the designation "Alumine 'Exal' Extra Pure Alpha A-6". These are essentially free from sharp edges, are of equant shape, and have an average diameter of about 0.15–0.2 micrometer. A photomicrograph did not reveal any particles larger than 0.5 micrometer. Also useful are:

|  | Mohs Hardness |
| --- | --- |
| Silicon carbide | 9 |
| Tungsten carbide | 9 |
| Boron nitride | 10 |
| Quartz | 7 |

Preferably the Mohs hardness of the equant particles is at least 8, because the guides of many tape drives may have a Mohs hardness of about 8. If the backside coating were repeatedly drawn across guides that were harder than a significant portion of the backside particles, the coating would gradually become smooth and would no longer deter tape-speed variations.

Any crosslinkable polymeric binder which is useful in magnetizable coatings should be useful in the backside coating of the invention. Preferred are polyurethanes, especially polyurethane block copolymers, comprising at least 15 mole percent 4,4'-diphenylmethane diisocyanate. The polyurethanes may be blended with other resins which can be crosslinked together with the polyurethane. Especially useful are high-molecular-weight copolymers of bisphenol A and epichlorohydrin such as "Phenoxy PKHH" and vinyl resins such as "VAGH" and "VROH", all from Union Carbide.

The polymeric binder from the backside coating need not be crosslinked if it performs as if it were crosslinked, such as the segmented copolyesters of U.S. Pat. No. 4,025,694 (Vermillion et al.). The polymeric binder either should be crosslinked or act as if it were crosslinked in order to withstand the high speeds and abrupt starts and stops such as are encountered in data processing uses.

Used as the binder polymer in the following example was a hydroxyl-terminated polyester of adipic acid and butane diol-1,4 with 4,4'-diphenylmethane diisocyanate and was obtained as "Estane" 5707 from B. F. Goodrich. The aluminum oxide particles were the "Alumine 'Exal' Extra Pure Alpha A-6" mentioned above. In the example, all parts are by weight.

EXAMPLE

The following were milled in a vibro energy mill ("Sweco") until a smooth dispersion was obtained:

|  | Parts |
| --- | --- |
| Aluminum oxide | 6.8 |
| Binder polymer | .45 |
| Dispersant | .33 |
| Tetrahydrofuran solvent | 7.35 |

A second dispersion was obtained by sandmilling the following until smooth:

|  | Parts |
| --- | --- |
| Conductive carbon black (average particle size 0.04 micrometer) | 15 |
| Binder polymer | 30 |
| Dispersant | 1 |
| Tetrahydrofuran solvent | 227 |
| Toluene | 23 |

The second dispersion was diluted with tetrahydrofuran solvent to 10% solids and charged to a disk-type high-speed mixer together with an amount of the first dispersion such that the alumina comprised 2.2 parts of the charged solids. After mixing for ten minutes, the entire charge was transferred to a paddle-type high-speed mixer, and 5 parts (3 parts solids) of a 60% solution of a toluene diisocyanate adduct of trimethylopropane ("Mondur" CB-60) was added as a crosslinking agent for the binder. After mixing for 15 minutes, this was knurl-coated onto one side of biaxially-oriented polyethylene terephthalate T-film of 43 gauge (11 micrometers) and dried in an oven to provide a backside coating of approximately 1.2 micrometers in thickness. The aluminum oxide particles comprised about 1.7% by volume of the backside coating, and the carbon black, about 22% by volume.

Subsequently, a magnetizable coating of acicular $\gamma\text{-Fe}_2\text{O}_3$ particles in the same binder was knurl-coated onto the frontside of the film, the magnetizable particles were oriented longitudinally by a magnetic field, and the coating was dried in an oven. The magnetizable coating was super-calendered to polish it to a surface roughness of about 0.1 micrometer (measured as described above), a procedure which inherently provides a degree of polishing to the backside coating. The surface roughness of the final backside coating was 0.35 micrometer. The overall thickness of the finished magnetic recording tape was about 19 micrometers.

450 feet of the tape were loaded into a cartridge as illustrated in the aforementioned Von Behren U.S. Pat. No. 3,692,255 and recorded with a 3200 FCI (flux changes per inch) signal while driving the tape in the reverse direction until fully wound onto the supply reel. The output signal on playback was used to control a phase lock loop running at the same frequency. The voltage controlled oscillator (VCO) control voltage was fed to an oscilloscope while a digital electronic counter monitored the VCO control voltage for any changes of frequency (spikes) greater than 2.4% at a frequency modulated rate of greater than 1000 Hz. No such changes of frequency were counted. When tape which was identical except for the omission of the aluminum oxide from the backside coating was tested, many spikes were detected in the VCO control voltage. The spikes occurred approximately every 9 mm and in a fairly regular manner until an appreciable proportion of the tape had been unwound from the supply reel. Thereafter the spikes occurred less frequently.

I claim:

1. In a flexible magnetic recording tape having a magnetizable frontside coating and a nonmagnetizable backside coating, each coating comprising inorganic particles dispersed in a nonmagnetizable polymeric binder, 0.5–10% by volume of said backside coating comprising nonmagnetizable particles of equant shape having an average diameter of at least 0.1 micrometer and a Mohs hardness of at least 7, and the tape having an overall thickness of 25 micrometers or less, the improvement comprising said equant particles comprise substantially all of the particles in the backside coating which have an average diameter greater than 0.1 micrometer, said equant particles have an average diameter of 0.1 to 0.5 micrometer, not more than 10% of said equant particles have an average diameter exceeding about 0.8 micrometer, substantially all of said equant particles are essentially free from sharp edges, and the peak-to-peak surface roughness of the backside coating is 0.2–0.8 micrometer.

2. In a flexible magnetic recording tape as defined in claim 1, the further improvement comprising
the Mohs hardness of said equant particles is at least 8.

3. In a flexible magnetic recording tape as defined in claim 2, the further improvement comprising
said equant particles are aluminum oxide.

4. In a flexible magnetic recording tape as defined in claim 3, the further improvement comprising
said equant particles comprise 1–3% by volume of said backside coating.

5. In a flexible magnetic recording tape as defined in claim 4, the further improvement comprising
said backing is biaxially-oriented polyethylene terephthalate film having an overall thickness of 20 micrometers or less.

6. In a magnetic recording tape system wherein the tape is wound on two spools and is driven by a pretensioned belt in contact with the outermost convolution of the tape on each spool, which tape has a magnetizable frontside coating and a nonmagnetizable backside coating, each coating comprising inorganic particles dispersed in a nonmagnetizable polymeric binder, 0.5–10% by volume of said backside coating comprising nonmagnetizable particles of equant shape having an average diameter of at least 0.1 micrometer and a Mohs hardness of at least 7, the tape having an overall thickness of 25 micrometers or less, the improvement comprising said equant particles comprise substantially all of the particles in the backside coating which have an average diameter greater than 0.1 micrometer, said equant particles have an average diameter of 0.1 to 0.5 micrometer, not more than 10% of said equant particles have an average diameter exceeding about 0.8 micrometer, substantially all of said equant particles are essentially free from sharp edges, and the peak-to-peak surface roughness of the backside coating is 0.2–0.8 micrometer.

7. In a magnetic recording tape system as defined in claim 6, the further improvement comprising
said equant particles are aluminum oxide.

8. In a flexible magnetic recording tape as defined in claim 7, the further improvement comprising
said equant particles comprise 1–3% by volume of said backside coating.

9. In a flexible magnetic recording tape as defined in claim 8, the further improvement comprising
said backing is biaxially-oriented polyethylene terephthalate film having an overall thickness of 20 micrometers or less.

10. A magnetic recording tape cartridge wherein the tape is wound on two spools and is driven by a pretensioned belt in contact with the outermost convolution of tape on each spool, which tape has a magnetizable frontside coating and a nonmagnetizable backside coating, each coating comprising inorganic particles dispersed in a nonmagnetizable binder, 0.5–10% by volume of said backside coating comprising nonmagnetizable particles of equant shape having an average diameter of at least 0.1 micrometer and a Mohs hardness of at least 7, and the tape having an overall thickness of 25 micrometers or less, the improvement comprising said equant particles comprise substantially all of the particles in the backside coating which have an average diameter greater than 0.1 micrometer, said equant particles have an average diameter of 0.1 to 0.5 micrometer, not more than 10% of said equant particles have an average diameter exceeding about 0.8 micrometer, substantially all of said equant particles are essentially free from sharp edges, and the peak-to-peak surface roughness of the backside coating is 0.2–0.8 micrometer.

11. In a magnetic recording tape cartridge as defined in claim 10, the further improvement comprising
said equant particles are aluminum oxide.

12. In a magnetic recording tape cartridge as defined in claim 11, the further improvement comprising
said equant particles comprise 1–3% by volume of said backside coating.

13. In a magnetic recording tape cartridge as defined in claim 12, the further improvement comprising
the backing of the tape is biaxially-oriented polyethylene terephthalate film having an overall thickness of 20 micrometers or less.

* * * * *